UNITED STATES PATENT OFFICE.

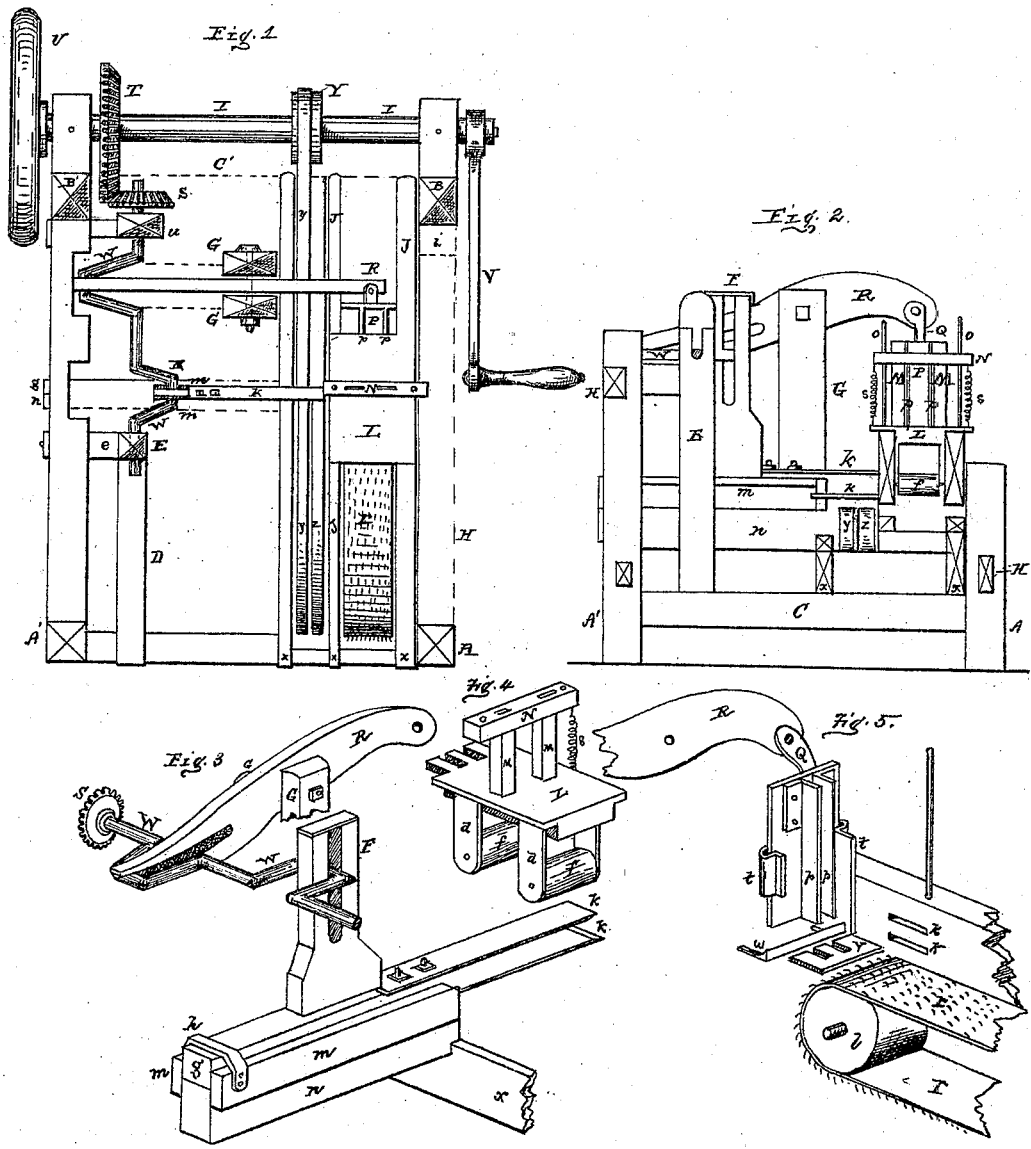

JOHN WEBER AND WILLIAM C. SIEFERT, OF LANCASTER, PENNSYLVANIA.

IMPROVEMENT IN MACHINES FOR CUTTING UP FAT MEATS FOR LARD-RENDERING.

Specification forming part of Letters Patent No. 134,717, dated January 7, 1873.

*To all whom it may concern:*

Be it known that we, JOHN WEBER and WILLIAM C. SIEFERT, of the city of Lancaster and State of Pennsylvania, have invented certain Improvements in a Machine for Cutting Fatty Matters into small square pieces for being rendered; and the following is a specification thereof:

The object of this invention is to supply a want long felt by butchers, which is, a machine that will easily and speedily cut up the fatty matters into small, say inch, square blocks, preparatory to rendering into lard, tallow, or suet in the ordinary manner, and to obviate the slow and tedious process of cutting by hand.

The accompanying drawing, with letters of reference marked thereon, illustrates the construction of the machine, in which—

Figure 1 is a plan view, seen from the top, showing the relative position of the parts brought to view; Fig. 2 is an end elevation, showing the relative position of the vertical and horizontal knives or cutters; Fig. 3 is a perspective view of the double crank and pinion, and its connection with the slotted lifting beam or lever and the slotted vertical post on the sliding block, connected with the horizontal cutters; Fig. 4 is a perspective view of the pressing-rollers and appliances detached; and Fig. 5 is perspective view of the vertical cutters and endless feed or apron, shown in part.

The drawing shows a wooden machine, and consequently heavier in some of its parts than when made of wrought or cast iron, as it is designed to build the machines. The four corner-posts, A′ A and B′ B, with the frames H′ H and cross-pieces C′ C, are shown in Fig. 1. The bearings for the main driving-shaft I are on top, across the front of the machine. This shaft has a fly-wheel, U, and beveled cog gear-wheel T at one end, and a crank-handle, V, at the other, by which latter the motion is imparted to a bevel-pinion S, on the end of a double crank-shaft, $w$, in bearings in the posts $u$, F, and E. The one crank actuates the slotted lever R on its fulcrum-pin in the slotted post G. The end of this lever or rocker R is connected with the vertical cutters P $p$ by a hinged connecting-rod, Q. These cutters combined are shown by Fig. 5. The broad blade P cuts across the entire width of the mouth of the feed-box. This broad blade has two or more blades, $p$, at right angle to it, attached on its inner face, thus dividing the piece, previously cut horizontally, both vertically and longitudinally, into distinct square pieces. $t$ shows the guide-grooves of the cutter P. The second crank, in a reverse position, operates in the slot of a vertical post, F, supported on a foot-piece, $g$, which slides between the guides $m$ $m$ attached to a fixed base, $n$, and held in a keeper, $h$. To this sliding foot-piece $g$ there are two or more horizontal cutters, $k$, affixed, which knives or chisel-like cutters pierce the fatty matters within the box or conveyer of an endless apron, $r$, beset with points, which feeds the fatty matter forward, either by the means of strap and pulleys or crank operating a pawl and ratchet feed. The pulley Y on the shaft I, with the belt $y$, operates the endless apron; but the crank ratchet and pawl may be substituted, used as ordinarily.

In order to confine the fatty matters between the upright sides J of the trough by a vertical pressure, I employ the device shown by Fig. 4, two rollers, $f f$, separated so that the horizontal blades $k$ $k$ can enter through the box between them, while rollers $f$ rest upon the fatty matter on each side. These rollers, with their bearings $d$, are connected with a top, L, cut out in front to adapt it to the vertical knives $p$ $p$ on P, which also supports two posts, M, with a cross-piece or top, N, which top-piece and top or cover L is perforated for guide-rods O, on each side, affixed to the upper edge of the trough or sides J J. There are also spiral springs $s$ on each side, so as to produce a pressure upon the said rollers, and preventing the fatty matter getting away from the direct side thrusts of the horizontal cutters. Thus, by the regular action and gradation, these thrusts separate the mass into broad belts, say an inch thick each. These belts are carried forward, and as regularly cut longitudinally into sections which would be of a continuous length, but the cross or broad blade P cuts them at the same time off in regular succession, about an inch in length. Thus two or more longitudinally and horizontally cut belts are severed so as to fall through the open throat in small square blocks, or regularly cut to be received in a vessel set under the machine for their reception, and ready to be rendered by heat in the ordinary way.

The chief point is the regulation and crank-action on the vertical and horizontal cutters P $p$ $p$ and $k$ $k$.

The operation is readily understood.

Fig. 5 shows a slotted plate, $v$, through which the cutters $p$ $p$ pass, their ends allowing space between them and a fixed sharp-edged cross-plate or knife, $w$, for the cross-blade P to pass, in order to secure a clean cut. Knife-cleaners may be added, if needed.

The mere frame-work is not essential, so that the cutters are substantially made and operated on suitable bearings, in the manner shown and described, and the fatty matters fed to the cutters and held by pressing-rollers and devices in a trough, substantially as shown and set forth.

For mincing, the knives or cutters may be set closer than an inch apart, as before stated, if desirable, suitable for melting or rendering the same, in the most approved manner.

We are not aware that a machine substantially like this was ever before used; therefore

What we claim as our invention is—

1. The arrangement of a double crank, W, when applied for operating combined vertical cutters P $p$ $p$ and horizontal cutters $k$ $k$, substantially in the manner and for the purpose specified.

2. The combined vertical cutters P $p$ $p$, in combination with the vertical guides $t$, slotted bed-plate $v$, and edged cross-blade $w$, jointly operating in the manner and for the purpose mentioned.

3. The horizontal knives or cutters $k$ $k$, in combination with the sliding foot-block $g$ in guides $m$, and keeper $h$ with the upright slotted post F, operated substantially in the manner and for the purpose described.

4. The pressing and holding device, consisting of the rollers $f$ $f$, bearings $d$, lid or top L, posts M, and cross-piece N, in combination with the spiral springs $s$ and guide-rods O on the top of the trough J with its endless apron $r$, all arranged substantially in the manner and for the purpose specified.

JOHN WEBER.
WILLIAM C. SIEFERT.

Witnesses:
W. B. WILEY,
JACOB STAUFFER.